(12) United States Patent
Liu et al.

(10) Patent No.: US 8,234,423 B2
(45) Date of Patent: Jul. 31, 2012

(54) MULTI-READER MULTI-WRITER CIRCULAR BUFFER MEMORY

(75) Inventors: Juqiang Liu, Cupertino, CA (US); Hua Ji, Cupertino, CA (US); Haisang Wu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/965,423

(22) Filed: Dec. 10, 2010

(65) Prior Publication Data

US 2011/0082952 A1 Apr. 7, 2011

Related U.S. Application Data

(63) Continuation of application No. 12/732,260, filed on Mar. 26, 2010, now Pat. No. 7,873,763, which is a continuation of application No. 11/673,240, filed on Feb. 9, 2007, now Pat. No. 7,716,396.

(51) Int. Cl.
*G06F 3/00* (2006.01)
*G06F 13/00* (2006.01)

(52) U.S. Cl. ............ 710/52; 710/57; 711/110; 711/149; 711/150

(58) Field of Classification Search ................ 710/1, 52, 710/54, 56; 711/1, 2, 5, 100, 101, 109, 110, 711/147, 149, 150, 152, 153, 167–169
See application file for complete search history.

(56) References Cited

U.S. PATENT DOCUMENTS

| | | | |
|---|---|---|---|
| 5,553,267 A | | 9/1996 | Herlihy |
| 5,867,734 A | * | 2/1999 | Drews ............................. 710/52 |
| 5,887,167 A | * | 3/1999 | Sutton ........................... 719/314 |
| 6,173,307 B1 | * | 1/2001 | Drews ........................... 718/102 |
| 7,246,182 B2 | | 7/2007 | Forin et al. |
| 7,716,396 B1 | | 5/2010 | Liu et al. |
| 2003/0188300 A1 | * | 10/2003 | Patrudu ........................ 717/149 |
| 2005/0141418 A1 | * | 6/2005 | Moon et al. ................... 370/229 |
| 2008/0010390 A1 | | 1/2008 | Abdelilah et al. |
| 2009/0204755 A1 | | 8/2009 | Rushworth et al. |

OTHER PUBLICATIONS

D M Dhamadhere; Operating Systems a Concept-Based Approach; 2006; McGraw-Hill; 2nd Edition; p. 411.*
Co-pending U.S. Appl. No. 12/732,260, filed Mar. 26, 2010 entitled "Multi-Reader Multi-Writer Circular Buffer Memory" by Juqiang Liu et al., 29 pages.

* cited by examiner

*Primary Examiner* — Richard B Franklin
(74) *Attorney, Agent, or Firm* — Harrity & Harrity, LLP (57) ABSTRACT

A system for managing a circular buffer memory includes a number of data writers, a number of data readers, a circular buffer memory; and logic configured to form a number of counters, form a number of temporary variables from the counters, and allow the data writers and the data readers to simultaneously access locations in the circular buffer memory determined by the temporary variables.

20 Claims, 6 Drawing Sheets

WRITER COUNTER

$W_c = K_w \times M_w^2 + L_w \times M_w + N_w = 1001011111$

$K_w = 37 \quad L_w = 3 \quad N_w = 3 \quad M_w = 4$

READER COUNTER

$R_c = K_r \times M_r^2 + L_r \times M_r + N_r = 10001101101$ $K_r = 17 \quad L_r = 5 \quad N_r = 5 \quad M_r = 8$

Fig. 6

MULTI-READER MULTI-WRITER CIRCULAR BUFFER MEMORY

RELATED APPLICATIONS

This application is a continuation of U.S. patent application Ser. No. 12/732,260, filed Mar. 26, 2010, which is a continuation of U.S. patent application Ser. No. 11/673,240, filed Feb. 9, 2007 (now U.S. Pat. No. 7,716,396), which are incorporated herein by reference.

BACKGROUND

Circular buffer memory management systems typically use some type of counter mechanism to allow a reader or a writer to access the circular buffer memory. When the system accesses the counter in order to read or write into memory, the counter cannot be accessed by another reader or another writer until the current read or write operation is completed and the counter value has been updated. Waiting for access to a counter value causes delays in memory read/write systems and limits the efficiency of all memory operations.

SUMMARY

In accordance with one aspect, a method is provided. The method may include testing an availability of a writer counter when one of a number of writers has data to be written into a memory; incrementing the writer counter and setting a temporary variable equal to the incremented writer counter when the writer counter is available; and writing the data into a location in the memory determined by the temporary variable.

According to another aspect, a network device may include a number of writers; a circular buffer memory for storing data; and logic to provide a writer counter, increment the writer counter to establish a temporary variable, where a temporary variable is established and associated with each one of the number of writers that has data to be written into the circular buffer memory; and write the data from the number of writers into the circular buffer memory at address locations determined by the associated temporary variables.

According to another aspect, a method may include testing an availability of a reader counter when one of a number of readers requests to read data from a memory; incrementing the reader counter and setting a temporary variable equal to the incremented reader counter when the reader counter is available; and reading the data from a location in the memory determined by the temporary variable.

According to another aspect, a network device may include a number of readers; a circular buffer memory for storing data; and logic to provide a reader counter, increment the reader counter to establish a temporary variable, where a temporary variable is established and associated with each one of the number of readers that requests to read data from the circular buffer memory; and read data from the circular buffer memory at address locations determined by the associated temporary variables.

According to another aspect, a network device may include a number of writers; a number of readers; a circular buffer memory; and logic to form a writer counter to provide a write address within the circular buffer memory, form a reader counter provide a read address within the circular buffer memory, establish a temporary writer variable from the writer counter, where a temporary writer variable is established and associated with each one of the number of writers that has data to be written into the circular buffer memory, and establish a temporary reader variable from the reader counter, where a temporary reader variable is established and associated with each one of the number of readers that requests to read data from the circular buffer memory, where the number of writers and the number of readers simultaneously access locations in the circular buffer memory determined by the temporary writer and the temporary reader variables.

According to another aspect, a network device may include a number of writers; a number of readers; a circular buffer memory; and logic to form a number of counters, form a number of temporary variables from the number of counters, and allow the number of writers and the number of readers to simultaneously access locations in the circular buffer memory defined by the temporary variables.

According to another aspect, a method may include providing a writer counter based on a writing starting address, a writer block length and a number of writers; providing a reader counter based on a reading starting address, a reader block length and number of readers; and allowing a number of writers and a number of readers to simultaneously access address locations in a circular buffer memory determined by the writer counter and the reader counter.

BRIEF DESCRIPTION OF THE DRAWINGS

The accompanying drawings, which are incorporated in and constitute a part of this specification, illustrate embodiments described herein and, together with the description, explain the embodiments. In the drawings.

DETAILED DESCRIPTION

The following detailed description of the embodiments refers to the accompanying drawings. The same reference numbers in different drawings may identify the same or similar elements. Also, the following detailed description does not limit the embodiments. Instead, the scope of the embodiments is defined by the appended claims and equivalents of the claim features.

Figure 1:
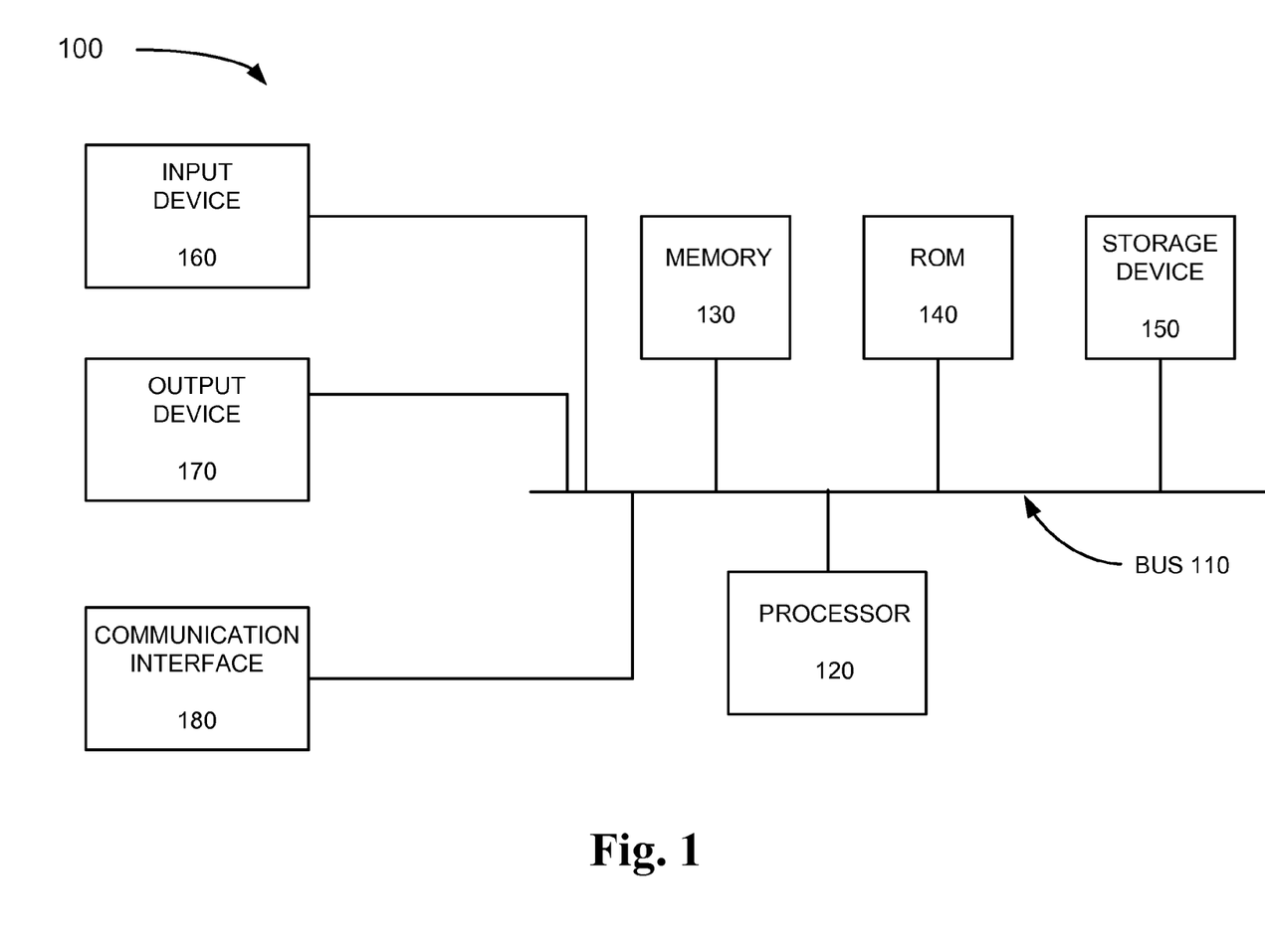
FIG. 1 is a diagram of an exemplary network device.

FIG. 1 is a diagram of an exemplary device 100. In one implementation, device 100 may take the form of a network device, such as a router, a web server, a switch, or the like. In another implementation, device 100 may take the form of another type of device.

Device 100 may include bus 110, processor 120, a memory 130, a read only memory (ROM) 140, a storage device 150, an input device 160, an output device 170 and a communication interface 180. Device 100 may also include one or more power supplies (not shown). One skilled in the art would recognize that device 100 may be configured in a number of other ways and may include other or different components.

Bus 110 permits communication among the components of device 100. Processor 120 may include any type of processor, microprocessor, or processing logic that may interpret and execute instructions. Processor 120 may execute instructions for performing reading and writing operations to memory 130.

Memory 130 may include a random access memory (RAM) or another type of dynamic storage device that stores information. Memory 130 may also contain a circular buffer memory region that may be accessed by a number of readers and writers in a simultaneous manner as controller by processor 120. ROM 140 may include a ROM device and/or another type of static storage device that may store static information and instructions for processor 120. Storage device 150 may include a magnetic disk or optical disk and its corresponding drive and/or some other type of magnetic or optical recording medium and its corresponding drive for storing information and instructions. Storage device 150 may also include a flash memory (e.g., an electrically erasable programmable read only memory (EEPROM)) device for storing information and instructions. Storage device 150 may also be used to store temporary variables or other intermediate information during execution of instructions by processor 120.

Input device 160 may include one or more mechanisms that permit data to be input to device 100. Output device 170 may include one or more mechanisms that may output data from device 100.

Communication interface 180 may include any transceiver-like mechanism that enables device 100 to communicate with other devices and/or systems. For example, communication interface 180 may include a modem or an Ethernet interface to a LAN. In addition, communication interface 180 may include other mechanisms for communicating via a network.

According to an exemplary implementation, device 100 may perform various processes in response to processor 120 executing sequences of instructions contained in a computer-readable medium (e.g., ROM 140). A computer-readable medium may include one or more memory devices or carrier waves. Such instructions may be read into ROM 140 from another computer-readable medium, such as storage device 150, or from a separate device via communication interface 180. Execution of the sequences of instructions contained in ROM 140 causes processor 120 to perform the acts that will be described hereafter. In alternative embodiments, hard-wired circuitry may be used in place of or in combination with software instructions to implement aspects of the embodiments. Thus, the systems and methods described herein are not limited to any specific combination of hardware circuitry and software.

Figure 2:
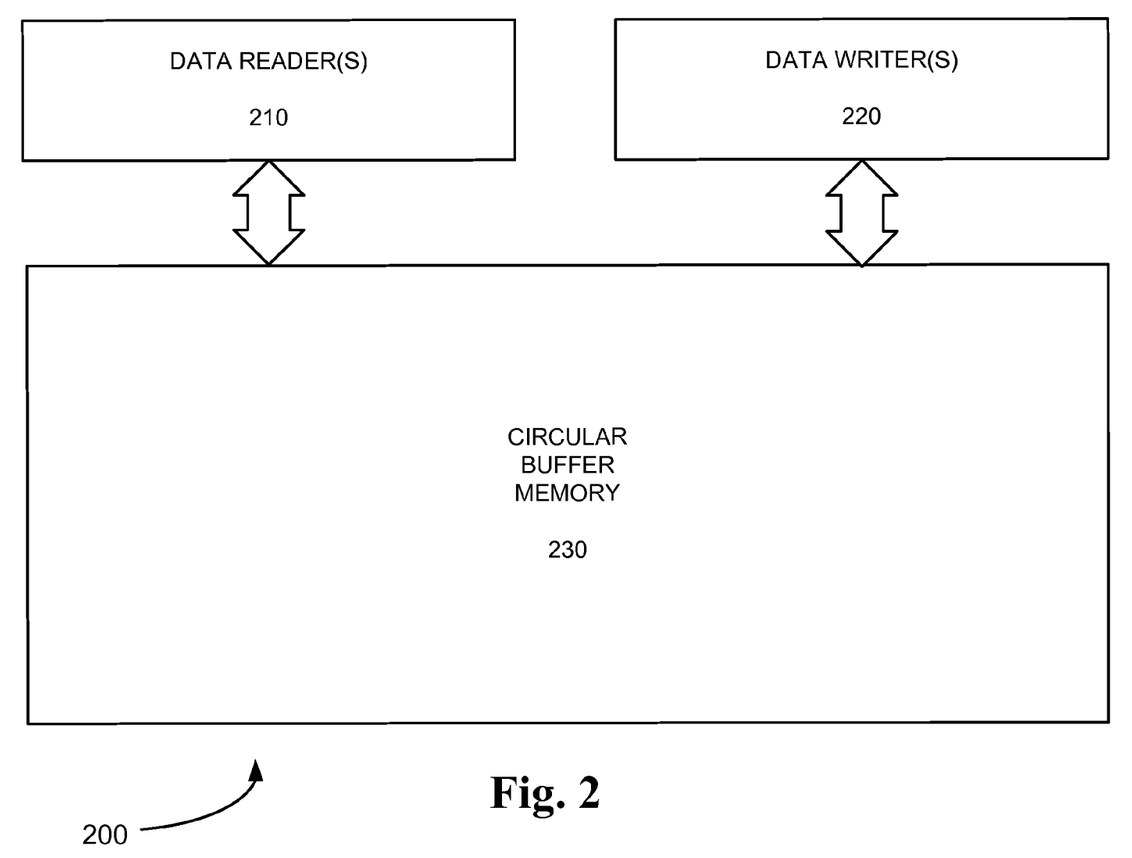
FIG. 2 is a diagram of exemplary circular buffer memory system.

FIG. 2 shows an exemplary circular buffer memory system 200 that may be implemented within device 100. Memory system 200 may include data readers 210, data writers 220 and a circular buffer memory 230.

Data readers 210 may include any type of device that may read data from a memory. Data readers 210 may be located in device 100, such as included in processor 120 or in output device 170, or may be located externally from device 100. Data readers 210 located external to network device 100 may access circular buffer memory 230 through communication interface 180, for example. In one implementation, each of data readers 210 may read one block of data from circular buffer memory 230 at a time.

Data writers 220 may include any type of device that may write data into a memory. Data writers 220 may be located in device 100, such as in processor 120 or data input device 160, or may be located externally from device 100. Data writers 220 that may be located externally from device 100 may access circular buffer memory 230 through communication interface 180, for example. In one implementation, each of data writers 220 may write one block of data into circular buffer memory 230 at a time.

Circular buffer memory 230 may include a number of addressable memory locations for storing data. Data may be written into circular buffer memory 230 by data writers 220 and data may be read from circular buffer memory 230 by data readers 210. Memory locations in circular buffer memory 230 may be individually addressed by block. Circular buffer memory 230 may include one or more memories (e.g., RAMs) that provide temporary, permanent or semi-permanent storage of data. Circular buffer memory 230 can also include large-capacity storage devices, such as a magnetic and/or optical device. Circular buffer memory 230 may be accessed by data readers 210 and data writers 220 according to instructions from processor 120.

Figure 3:
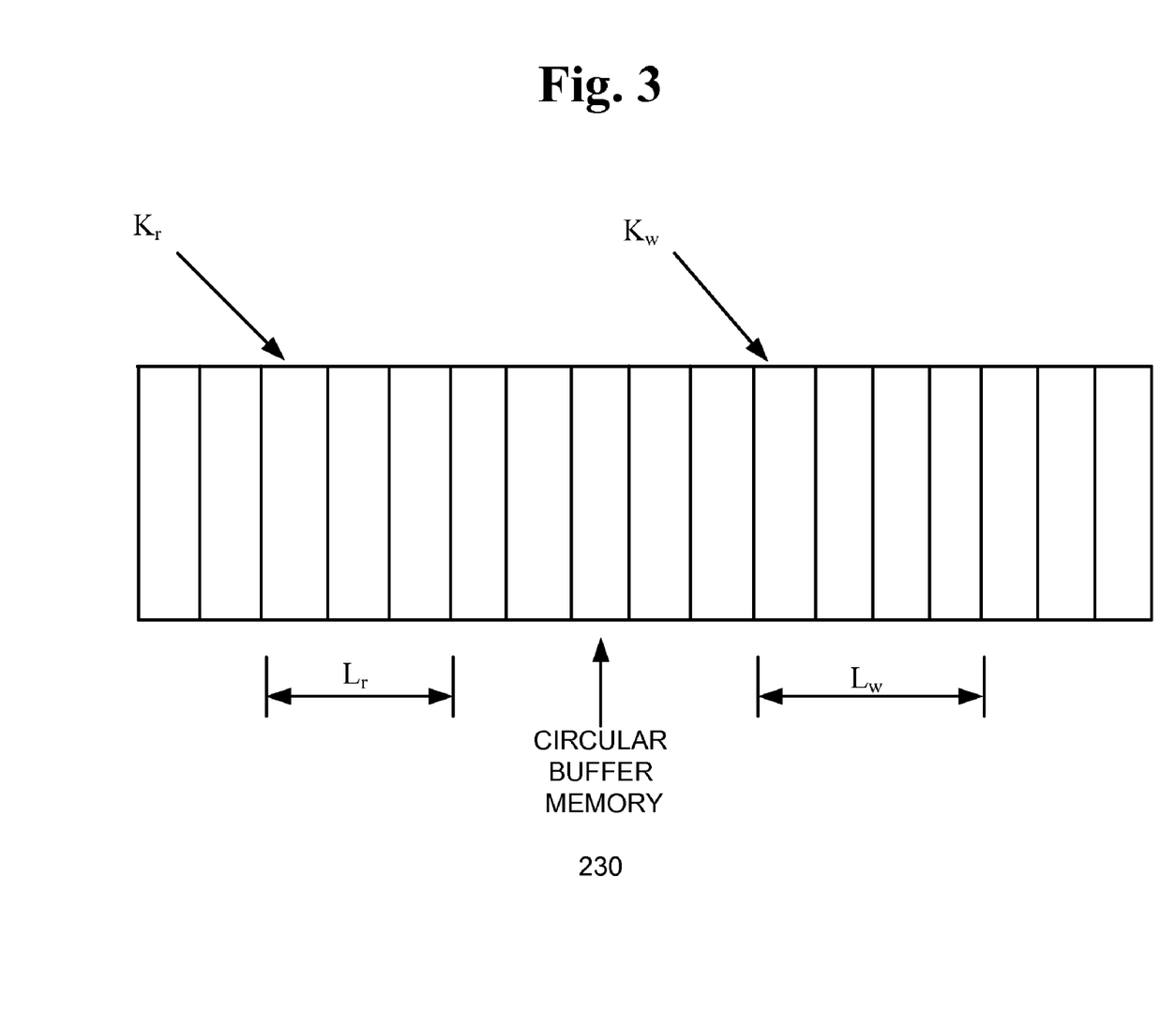
FIG. 3 is a diagram of variables used in an exemplary process used to access a circular buffer memory.

FIG. 3 is a diagram of exemplary variables used for reading from and writing into circular buffer memory 230. FIG. 3 illustrates variables $K_r$, $K_w$, $L_r$, and $L_w$ that be used in reader and writer counters, where the counter values may identify positions or addresses within circular buffer memory 230, for example.

Variable $K_r$ may represent a current reading position address within circular buffer memory 230. For example, $K_r$ may be a value such as 512, indicating that memory location or address 512 is a current starting location within circular buffer memory 230 of a block of data being read by data readers 210.

Variable $K_w$ may represent a current writing position address within circular buffer memory 230. For example, $K_w$ may be a value such as 528, indicating that memory location or address 528 is a current starting location of a block of data being written into circular buffer memory 230 by data writers 220.

Variable $L_r$ may represent a current length of a block of reading addresses within circular buffer memory 230. For example, if three data readers 210 are currently reading data from circular buffer memory 230, (as each reader may read only one block) the value of $L_r$ may be three.

Variable $L_w$ may represent a current length of a writing block of addresses within circular buffer memory 230. For example, if four data writers 220 are currently writing data into circular buffer memory 230, (as each writer may write only one block) the value of $L_w$ may be four.

In addition to the variables shown in FIG. 3, constants relating to a size of circular buffer memory 230 and number of data readers 210 and data writers 220, may also be used in the reader and writer counters. For example, a circular buffer memory size may be represented by $B_s$, where the size of the circular buffer memory 230 may be a predetermined number of addressable blocks of memory (e.g., 1024 or 4096, etc.). A maximum number of concurrent data readers 210 or data writers 220 allowed to access the circular buffer memory 230 may be represented by $M_r$ and $M_w$ respectively. Also, for example, a current number of data readers 210 and a current number of data writers 220 accessing circular buffer memory 230, may be represented by $N_r$ and $N_w$ respectively.

Using the variables and constants as described above, a reader counter ($R_c$) may be defined. In one embodiment, the reader counter $R_c = K_r \times M^2_r + L_r \times M_r + N_r$. Similarly, a writer counter ($W_c$) may be defined by $W_c = K_w \times M^2_w + L_w \times M_w + N_w$.

Figure 4:
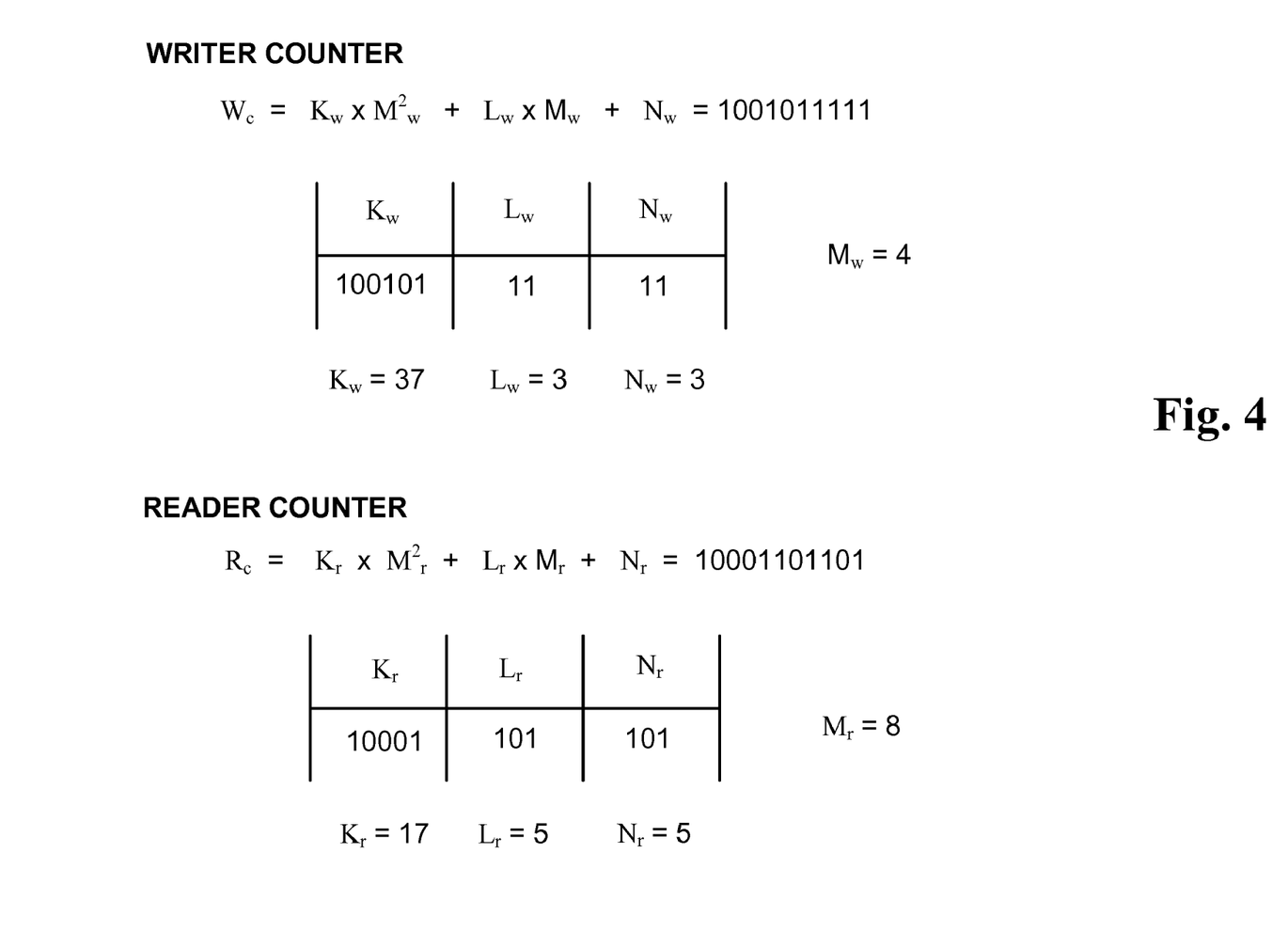
FIG. 4 illustrates exemplary writer and reader counters.

FIG. 4 illustrates examples of a reader counter and a writer counter. Processor 120 may multiply the variables in the reader and writer counters by a power of "M," that may form "base M" numbers, for example.

If, for example, $K_w = 37$, $L_w = 3$, $N_w = 3$ and $M_w = 4$, the writer counter (in binary representation) may be 1001011111. As shown in FIG. 4, the first two bits of the writer counter "11," may represent the value of $N_w$ (3 in this example). The next two bits (third and fourth) of the writer counter "11," may represent the value of $L_w$ (3 in this example). The next six bits (fifth through tenth) of the writer counter "100101," may represent the value of $K_w$ (37 in this example). In this example, as the variable $M_w$=4, the writer counter may form a "base 4" number.

If, for example, $K_r$=17, $L_r$=5, $N_r$=5 and $M_r$=8, the reader counter (in binary representation) may be 10001101101. As shown in FIG. 4, the first three bits of the reader counter "101," may represent the value of $N_r$ (5 in this example). The next three bits (fourth through sixth) of the reader counter "101," may represent the value of $L_r$ (5 in this example). The next five bits (seventh through eleventh) of the reader counter "10001," may represent the value of $K_r$ (17 in this example). In this example, as the variable $M_r$=8, the reader counter may form a "base 8" number.

In the examples shown in FIG. 4, the bases ($M_w$ and $M_r$) of the counters are a power of 2, which may allow the individual variables in the reader and writer counters to be obtained directly from the total counter value. For example, the $L_r$ value of 5 (101), may be read directly from the reader counter value of 10001101101, by masking the first three bits (101) and masking the last five bits (10001) of the reader counter.

In other embodiments, the counter bases "M" may be any number of data readers 210 and data writers 220 that is not a power of two. For example, $M_w$ may equal 3 and $M_r$ may equal 7. In other embodiments for example, $M_r$ may equal $M_w$, when the maximum number of data readers 210 and the maximum number of data writers 220 may be the same number. In all the exemplary embodiments described above, the values of $L_r$ and $N_r$ are less than $M_r$, and the values of $L_w$ and $N_w$ are less than $M_w$.

Processor 120 may access the reader and writer counters and may perform operations on the counter values to obtain the individual variables from the counter values. For example, processor 120 may access writer counter ($W_c$) and perform modulo operations (indicated by "%") and/or division operations (that return the value of the quotient without the remainder) to derive the variables $K_w$, $L_w$, and $N_w$ from the writer counter. For example, $K_w=W_c/M^2_w$, $L_w=(W_c \% M^2_w)/M_w$ and $N_w=W_c \% M_w$. Similarly, after accessing the reader counter ($R_c$), processor 120 may operate on $R_c$ to obtain the variables $K_r$, $L_r$, and $N_r$ from the reader counter. For example, $K_r=R_c/M^2_r$, $L_r=(R_c \% M^2_r)/M_r$ and $N_r=R_c \% M_r$. As will be described below, the reader and writer counters may be accessed and processed by processor 120 to test the variables contained in the counters which may allow data readers 210 and data writers 220 simultaneous access to circular buffer memory 230.

Figure 5:
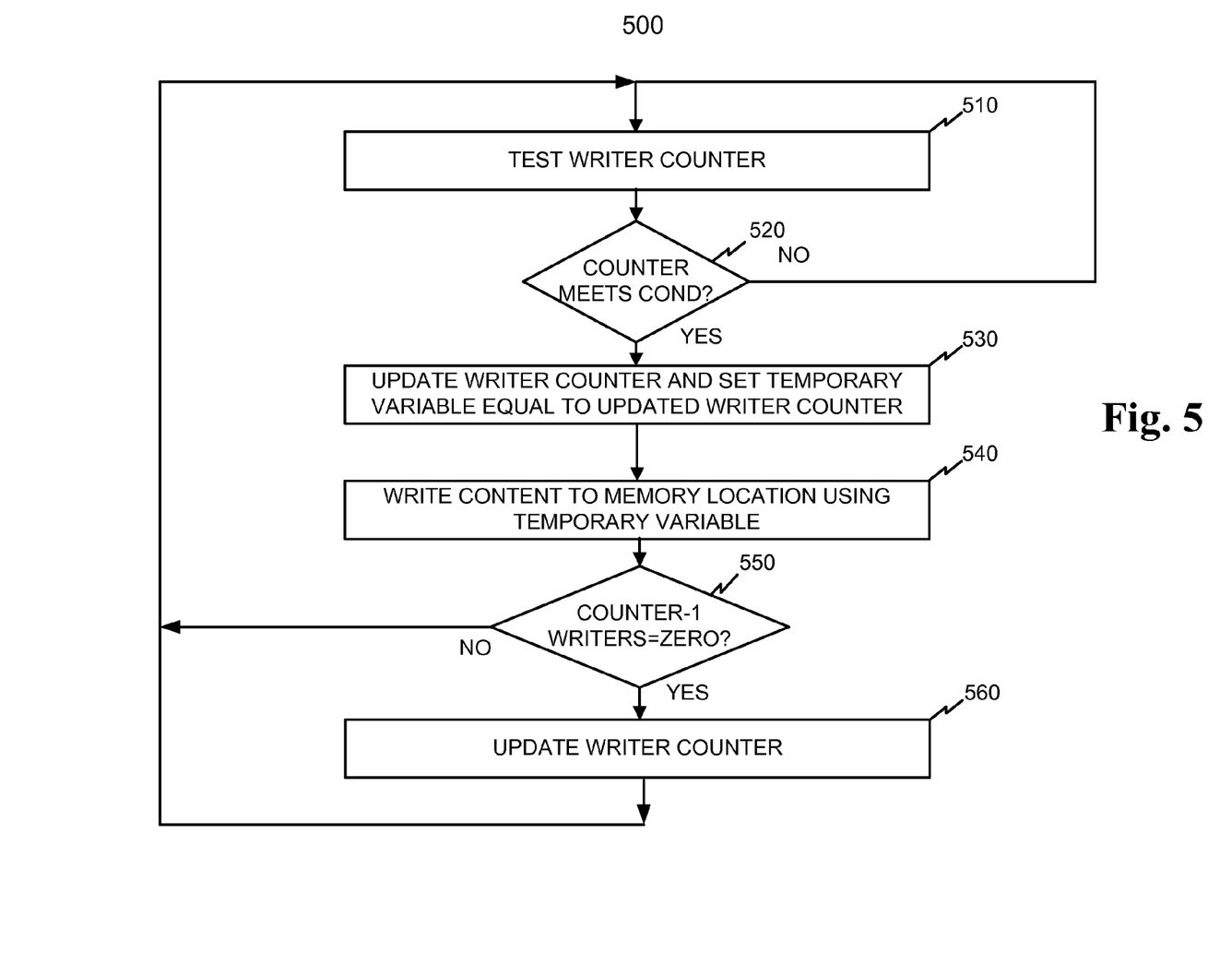
FIG. 5 is an exemplary flow diagram of writing into a circular buffer memory.

FIG. 5 is a flow diagram illustrating an exemplary process 500 of writing into a circular buffer memory 230. Process 500 may begin by testing a writer counter (block 510). For example, when a data writer 220 has data to write to memory 230, processor 120 may access the writer counter $W_c$ and determine if the writer counter is available based on two conditions. The first condition may be to determine if the number of data writers 220 currently accessing the circular memory buffer ($N_r$) plus one is less than the maximum number of data writers ($M_w$) and the second condition may be to determine if the starting address of the writer block plus the length of the writer block does not overlap the address of the reader block. For example, the first condition may be satisfied when $N_r+1<M_r$. Using the variables obtained from the writer counter, the second condition may be satisfied, for example, when $K_w+L_w-B_s<K_r$. If, for example, both the first and second conditions are true (block 420) the writer counter may be available (Yes) and process 500 may proceed to block 530. If the writer counter $W_c$ does not meet the conditions (No) applied in block 520, process 500 may return to test the write counter value again (block 510).

If, for example, the writer counter has met the conditions in block 520, the writer counter is updated and a local temporary variable "$T_w$" is set equal to the updated writer counter value (block 530). For example, the writer counter may be incremented by: $W_c=W_c+M_w+1$. In this example, incrementing the writer counter by $M_w+1$, increments both the $L_w$ value by one (writer block length) and the $N_w$ value by one (number of writers currently accessing the circular buffer memory). A temporary variable ($T_w$) associated with data writer 220 may then be set equal to the incremented writer counter value (block 530). Using the temporary variable associated with one of the data writers 220 in block 530, data may be written into the memory location of circular memory buffer 230 defined using the temporary variable (block 540). For example, as the variable $T_w$ includes updated values of variables $K_w$, $L_w$ and $N_w$ from the incremented writer counter, data writer 220 may write data into circular buffer memory slot defined by $K_w+L_w-1$ (block 540). For example, processor 120 may perform modulo and division operations on the temporary variable $T_w$ such as: $[(T_w/M^2_w)+(T_w \% M^2_w)/M_w] \% B_s-1$, to determine the circular buffer memory address location at which data writer 220 may write into circular buffer memory 230.

After data has been written to a location in circular buffer memory 230, by data writer 220, the writer counter may be updated. For example, processor 120 may decrement writer counter by one and then may determine if a number of writers ($N_w$) currently writing data into circular buffer memory 230 is equal to zero (block 550). For example, processor 120 may perform an operation on the writer counter such as ($W_c-1$) % $M_w$, and determine if the result is equal to zero. This exemplary operation determines a current value (after being decremented by one) of the $N_w$ variable (current number of writers accessing the circular buffer memory). If, for example, there are data writers 220 currently writing into circular buffer memory 230 (No), the writer counter has been decremented by one and the process may return to block 510. If, for example, there are no data writers 220 writing into the circular buffer memory 230 (($W_c-1$) % $M_w$=0 is true (Yes)) the writer counter may be updated (block 560). For example, the writer starting address variable $K_w$ is updated by adding the length of writing block ($L_w$) to the previous value of $K_w$. For example, processor 120 may perform an operation such as $W_c=[(W_c/M^2_w)+(W_c \% M^2_w)/M_w] \times M^2_w$ in order to update the writer counter. In this example, multiplying the sum of the $K_w$ and $L_w$ variables by $M^2_w$ results in modifying the appropriate digits (that represent the $K_w$ variable) of the base M writer counter as described above in FIG. 4. After modifying the writer counter in block 560, the process may return to block 510 to process the next writing operation.

Each time, for example, a data writer 220 initiates a writing operation (initiates process 500), processor 120 may access the writer counter, increment the writer counter and form a temporary variable ($T_w$) associated with the specific data writer 220. By forming "local" temporary variables from a "global" writer counter, the global writer counter may remain free to be accessed by processor 120 to initiate another writing operation. In this manner for example, a number of writing operations may be simultaneously performed in circular buffer memory 230.

Figure 6:
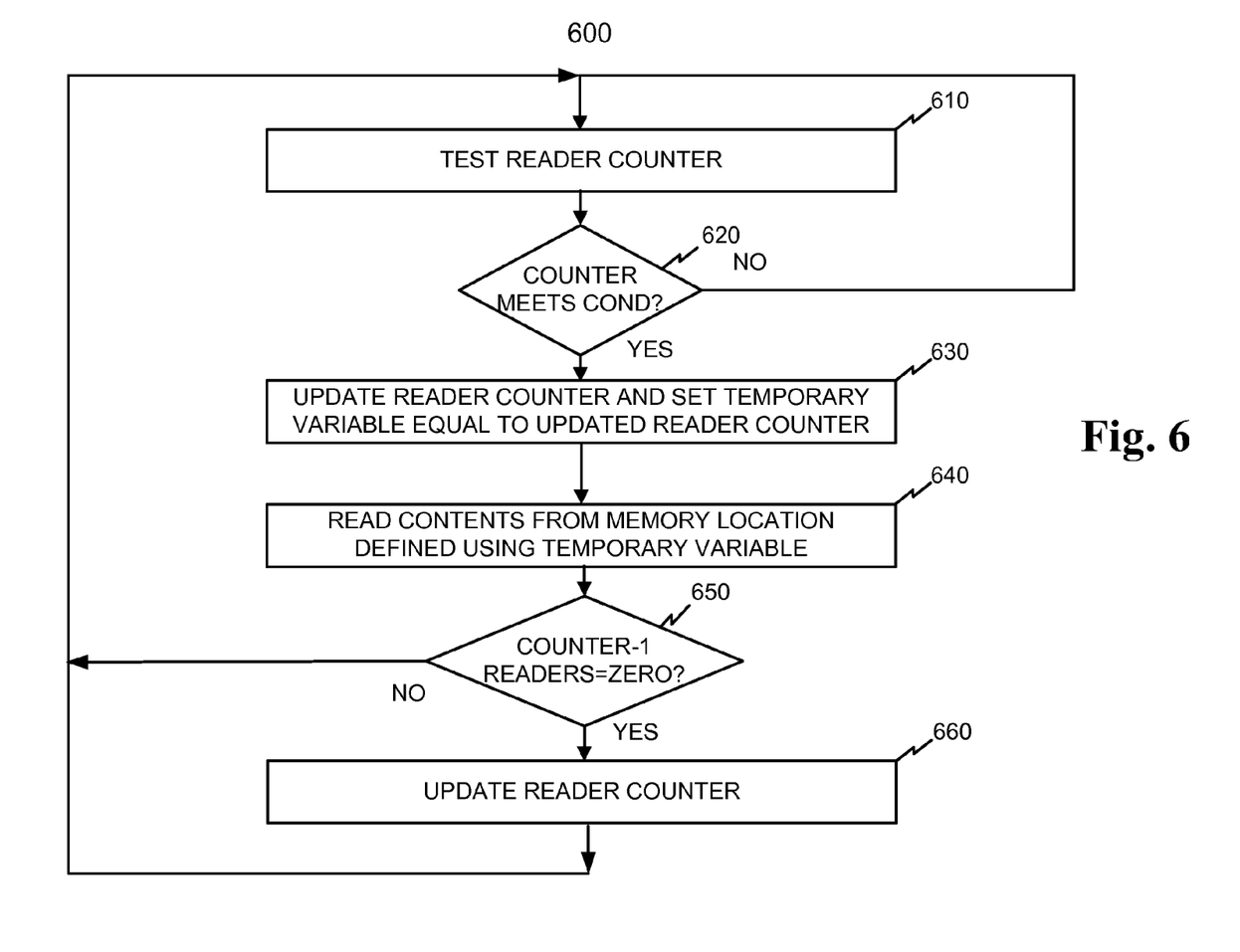
FIG. 6 is an exemplary flow diagram of reading from a circular buffer memory.

FIG. 6 is a flow diagram illustrating an exemplary process 600 of reading from a circular buffer memory. Process 600 may begin by testing a read counter (block 610). For example, when a data reader 210 requests to read from circular buffer memory 230, processor 120 may access the reader counter $R_c$ and determine if the reader counter is available based on two conditions. The first condition may be to determine if the number of data readers 210 currently accessing the circular memory buffer ($N_r$) plus one is less than the maximum number of readers ($M_r$) and the second condition may be to determine if the starting address of the reader block plus the length of the reader block does not overlap the address of the writer block. For example, the first condition may be satisfied when $N_r+1<M_r$. Using the variables obtained from the reader counter, the second condition may be satisfied, for example, when $K_r+L_r-B_s<K_w$. If, for example, both the first and second conditions are true (block 620), the reader counter may be available (Yes) and process 600 may proceed to block 630. If the reader counter $R_c$ does not meet the conditions (No) applied in block 620, process 600 may return to test the reader counter again (block 610).

If, for example, the reader counter has met the conditions in block 620, the reader counter is updated and a local temporary variable "$T_r$" is set equal to the updated reader counter value (block 630). For example, the reader counter may be incremented by: $R_c=R_c+M_r+1$. In this example, incrementing the reader counter by $M_r+1$, increments both the $L_r$ value by one (reader block length) and the $N_r$ value by one (number of readers currently accessing the circular buffer memory). A temporary variable ($T_r$) associated with data reader 210 may then be set equal to the incremented reader counter value (block 630). Using the temporary variable associated with data reader 210 in block 630, data may be read from the memory location of circular memory buffer 230 defined using the temporary variable (block 640). For example, as the variable $T_r$ includes updated values of variables $K_r$, $L_r$ and $N_r$ from the incremented reader counter, data reader 210 may write data into circular buffer memory slot defined by $K_r+L_r-1$ (block 640). For example, processor 120 may perform modulo and division operations on the temporary variable $T_r$ such as: $[(T_r/M^2_r)+(T_r \% M^2_r)/M_r] \% B_s-1$, to determine the circular buffer memory address location from which data reader 210 may read circular buffer memory 230.

After data has been read from a location in circular buffer memory 230, by a data reader 210, the reader counter may be updated. For example, processor 120 may decrement reader counter by one and then may determine if a number of readers ($N_r$) currently reading data from circular buffer memory 230 is equal to zero (block 650). For example, processor 120 may perform an operation on the reader counter such as $(R_c-1) \% M_r$, and determine if the result is equal to zero. This exemplary operation determines a current value (after being decremented by one) of the $N_w$ variable (current number of readers accessing the circular buffer memory). If, for example, there are data readers 210 currently reading from circular buffer memory 230 (No), the reader counter has been decremented by one and the process may return to block 610. If, for example, there are no data readers 210 reading from the circular buffer memory 230 (($R_c-1) \% M_r=0$ is true (Yes)) the reader counter may be updated (block 660). For example, the reader starting address variable $K_r$ is updated by adding the length of reading block ($L_r$) to the previous value of $K_r$. For example, processor 120 may perform an operation such as $R_c=[(W_c/M^2_r+(R_c \% M^2_r)/M_r]\times M^2_r$ in order to update the reader counter. In this example, multiplying the sum of the $K_r$ and $L_r$ variables by $M^2_r$ results in modifying the appropriate digits (that represent the $K_r$ variable) of the base M reader counter as described above in FIG. 4. After modifying the reader counter in block 660, the process may return to block 610 to process the next reading operation.

Each time, for example, a data reader 210 initiates a reading operation (initiates process 600), processor 120 may access the reader counter, increment the reader counter and form a temporary variable ($T_r$) associated with the specific data reader 210. By forming "local" temporary variables from a "global" reader counter, the global reader counter may remain free to be accessed by processor 120 to initiate another reading operation. In this manner for example, a number of reading operations may be simultaneously performed in circular buffer memory 230.

CONCLUSION

Implementations described herein may provide a number of data writers and a number of data readers simultaneous access to a circular buffer memory.

The foregoing description of preferred embodiments of the present embodiments provides illustration and description, but is not intended to be exhaustive or to limit the embodiments to the precise form disclosed. Modifications and variations are possible in light of the above teachings or may be acquired from practice of the embodiments. For example, while series of acts have been described with regard to FIGS. 5-6, the order of the acts may differ or be performed in parallel in other implementations consistent with the present embodiments.

No element, act, or instruction used in the description of the principles of the embodiments should be construed as critical unless explicitly described as such. Also as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    determining whether a first condition is satisfied, the first condition being associated with:
        a number of a plurality of writers currently accessing a circular buffer memory, or
        a number of a plurality of readers currently accessing the circular buffer memory;
    determining whether a second condition is satisfied based on an address of a writing block of the circular buffer memory, an address of a reader block of the circular buffer memory, and a length of a block to be written to or read from the circular buffer memory;
    incrementing a counter associated with the circular buffer memory when the first condition and the second condition are satisfied, incrementing the counter setting the counter equal to a current value; and
    accessing, based on the counter being incremented and by one of the plurality of writers or by one of the plurality of readers, a location of the circular buffer memory, the location being determined based on a variable that is set equal to the current value of the counter.

2. The method of claim 1, further comprising:
    determining whether the counter is available, and
    incrementing the counter based on the counter being available.

3. The method of claim 2,
    where the counter is determined to be available when the first condition and the second condition are satisfied.

4. The method of claim 1, further comprising:
    incrementing, a second time, the counter associated with the circular buffer memory, incrementing the counter the second time setting the counter equal to another current value; and
    accessing, by another one of the plurality of writers or by another one of the plurality of readers, another location of the circular buffer memory, the other location being determined by another variable set equal to the other current value of the counter.

5. The method of claim 1, where, after accessing the location, the method further comprises:
determining a current quantity of the plurality of readers accessing the circular buffer memory or a current quantity of the plurality of writers accessing the circular buffer memory; and
updating the counter when the current quantity of the plurality of readers or the current quantity of the plurality of writers equals zero.

6. The method of claim 1, where the variable set equal to the current value of the counter is associated with the one of the plurality of writers or the one of the plurality of readers accessing the location in the circular buffer.

7. A network device comprising:
logic to:
determine a number of writers currently accessing a circular buffer memory,
determine whether a starting address of a writer block, to be written to the circular buffer memory, plus a length of the writer block overlaps an address of a reader block associated with the circular buffer memory,
increment, when data is to be transferred to a circular buffer memory, a counter based on the number of writers currently accessing the circular buffer memory and determining whether the starting address of the writer block plus the length of the writer block overlaps the address of the reader block,
the counter being associated with the transfer of the data to the circular buffer memory,
the logic to increment the counter including logic to set the counter equal to a current value,
define, based on incrementing the counter and using a variable set equal to the current value of the counter, a location in the circular buffer memory, and
transfer the data to the defined location.

8. The network device of claim 7, where the logic is further to:
determine whether the counter is available, and
increment the counter based on the counter being available.

9. The network device of claim 8, where the logic is further to:
determine that the counter is available when the starting address of the writer block plus the length of the writer block overlaps the address of the reader block.

10. The network device of claim 9, where the logic is further to:
determine whether a first condition is satisfied based on the number of writers currently accessing the circular buffer memory and a maximum number of writers allowed to concurrently access the circular buffer memory, and
determine, when the first condition is satisfied, that the counter is available when the starting address of the writer block plus the length of the writer block does not overlap the address of the reader block.

11. The network device of claim 10, where the logic is further to:
determine that the first condition is satisfied when the number of writers currently accessing the circular buffer memory is less than the maximum number of writers allowed to concurrently access the circular buffer memory.

12. The network device of claim 7, where the logic is further to:
associate the variable set equal to the current value with one of a plurality of writers having data to be written to the circular buffer memory.

13. The network device of claim 7, where the logic is further to:
increment, when data is to be transferred from the circular buffer memory, another counter that is associated with the transfer of the data from the circular buffer memory, where incrementing the other counter sets the other counter equal to another current value, and
define, using another variable that is set equal to the other current value, another location in the circular buffer memory, where the data is to be transferred from the defined other location.

14. A network device comprising:
logic to:
determine a number of readers currently accessing a circular buffer memory,
determine whether a starting address of a reader block, associated with data to be read from the circular buffer memory, plus a length of the reader block overlaps a starting address of a writer block associated data to be written to the circular buffer memory,
increment, when data is to be transferred from a circular buffer memory, a counter based on the determined number of readers and determining whether the starting address of the reader block plus the length overlaps the starting address of the writer block,
the counter being associated with the transfer of the data from the circular buffer memory,
the logic to increment the counter including logic to set the counter equal to a current value,
define, based on the counter being incremented and using a value that is set equal to the current value of the counter, a location in the circular buffer memory, and
transfer the data from the defined location.

15. The network device of claim 14, where the logic is further to:
determine whether the counter is available, and
increment the counter further based on the counter being available.

16. The network device of claim 15, where the logic is further to:
determine that the counter is available when the starting address of the reader block plus the length of the reader block overlaps the address of the writer block.

17. The network device of claim 16, where the logic is further to:
determine whether a first condition is satisfied based on the number of readers currently accessing the circular buffer memory and a maximum number of readers allowed to concurrently access the circular buffer memory, and
determine, when the first condition is satisfied, that the counter is available when the starting address of the reader block plus the length of the reader block does not overlap the address of the writer block.

18. The network device of claim 17, where the logic is further to:
determine that the first condition is satisfied when the number of readers currently accessing the circular buffer memory is less than the maximum number of readers allowed to concurrently access the circular buffer memory.

19. The network device of claim 14, where the logic is further to:

associate the variable with one of a plurality of readers having data to be written from the circular buffer memory.

20. The network device of claim 14, where the logic is further to:
increment, when data is to be transferred to the circular buffer memory, another counter associated with the transfer of data to the circular buffer memory, where incrementing the other counter sets the other counter equal to another current value,
define, using another value that is set equal to the other current value of the other counter, another location in the circular buffer memory, and
transfer the data to the defined other location.

\* \* \* \* \*